US008787532B1

(12) United States Patent
Adam

(10) Patent No.: US 8,787,532 B1
(45) Date of Patent: Jul. 22, 2014

(54) SEMI AUTOMATED REVIEW OF CONTACT CENTER AGENT PERFORMANCE

(71) Applicant: Zoom International s.r.o., Prague (CZ)

(72) Inventor: Pavel Adam, Roudnice nad Labem (CZ)

(73) Assignee: Zoom International s.r.o., Prague (CZ)

( * ) Notice: Subject to any disclaimer, the term of this patent is extended or adjusted under 35 U.S.C. 154(b) by 0 days.

(21) Appl. No.: 14/220,123

(22) Filed: Mar. 19, 2014

Related U.S. Application Data

(60) Provisional application No. 61/887,903, filed on Oct. 7, 2013.

(51) Int. Cl.
*H04M 1/64* (2006.01)
(52) U.S. Cl.
USPC ............... 379/67.1; 379/265.06; 707/616
(58) Field of Classification Search
USPC ............... 379/67.1, 265.06; 707/616
See application file for complete search history.

(56) References Cited

U.S. PATENT DOCUMENTS

| 7,991,613 B2 | 8/2011 | Blair | |
|---|---|---|---|
| 2008/0281620 A1* | 11/2008 | Schalk et al. | 705/1 |
| 2011/0002451 A1 | 1/2011 | Moran et al. | |
| 2013/0262396 A1* | 10/2013 | Kripalani et al. | 707/674 |

* cited by examiner

*Primary Examiner* — Quynh Nguyen
(74) *Attorney, Agent, or Firm* — Galvin Patent Law LLC; Brian R. Galvin

(57) ABSTRACT

A system for semi automated review of contact center agent performance, comprising a data manager, an evaluator user interface, a speech analytics engine, an automated evaluator software module, a database, and a call recording system. The call recording system records customer calls and stores the resulting call recordings in the database. The data manager collects and preprocesses a plurality of data elements pertaining to a plurality of specific call recordings and stores them in the database as metadata associated with the respective call recordings. The speech analysis engine conducts automated speech analysis of call recording, tags the call recording with a metadata element, and stores the metadata element in the database. The automated evaluator software module performs analysis of a call recording and prioritizes at least a subset of the call recordings for review by a human reviewer.

4 Claims, 5 Drawing Sheets

SEMI AUTOMATED REVIEW OF CONTACT CENTER AGENT PERFORMANCE

CROSS REFERENCE TO RELATED APPLICATIONS

This application claims priority to U.S. provisional patent application Ser. No. 61/887,903, titled "SEMI AUTOMATED REVIEW OF CONTACT CENTER AGENT PERFORMANCE", which was filed on Oct. 7, 2013, the entire specification of which is incorporated herein by reference.

BACKGROUND OF THE INVENTION

1. Field of the Art

The disclosure relates to the field of performance analysis, and more particularly to semi automated analysis and review of key performance indicators in contact centers.

2. Discussion of the State of the Art

When managing or measuring a business or other organization, it is often desirable to measure particular key performance indicators (KPIs), such as to score performance relevant to specific quantitative metrics or qualitative goals. For example, a contact center may wish to measure agent performance and score agents according to specific performance goals or milestones, such as call handle time or customer satisfaction ratings (such as may be received from surveys of customers, as is common in the art).

Accordingly, it may be necessary or desirable to review a large quantity of data to take measurements and make adequate determinations as to performance scoring (for example, reviewing a large number of customer interactions across many contact center agents). Such review may be difficult or impossible to perform manually, leading to inadequate scoring procedures wherein data may be skipped or insufficiently reviewed in the interest of time.

What is needed in the art is a means to aid in performance review through automation such that a larger quantity of data may be reviewed in an allotted time, improving the relevancy and accuracy of KPI evaluation.

SUMMARY OF THE INVENTION

Accordingly, the inventor has conceived and reduced to practice, in a preferred embodiment of the invention, a system and methods for performance evaluation supported by automated analysis.

According to a preferred embodiment of the invention, a system for automation of performance analysis comprising a review manager that may receive user interaction (such as from a user reviewing data to perform manual analysis) and may present data for review as well as accept input such as review forms (as are commonly used in the art, such as to provide a standardized form-based analysis), and a data manager that may perform automated or semi-automated analysis of data prior to and during presentation to a review manager (for example, using preconfigured or user-configurable criteria to control the presentation of data), is disclosed.

According to the embodiment, a review manager may present data for review, such as retrieving stored data from a database or similar storage. It will be appreciated that such storage may vary in form or implementation, such as any of a variety of hardware- or software-based storage means common in the art, for example a software-based database such as MICROSOFT SQL SERVER™ or hardware-based integrated or removable storage device such as a hard disk drive or magnetic storage medium. It should be further appreciated that any such storage utilized may operate separately from other components of the system of the invention and may be accessed via any appropriate direct connection (such as a data connection between a storage device and computing devices operating other components of the system of the invention, such as a review manager) or via the Internet or other data communication network, as may be appropriate for a remote data storage (i.e., operating in a separate physical location form other components) or cloud-based storage service such as AMAZON S3™ or other such storage means common in the art.

According to the embodiment, a review manager may receive user interaction, such as queries for data to be presented for review (such as a user requesting specific sets of data), or input of review forms or other interactive data. It will be appreciated by one having skill in the art that it may not be desirable to allow a user to manipulate data presented for review, such as to prevent tampering with data being analyzed, and as such a review manager may be configured or configurable—such as via stored configuration information or via an administrative or similar privileged user that may control behavior and operation of a review manager, for example an enterprise information technology (IT) administrator—to control or limit any input by a user, such as to enable a user to fill out review forms but not to perform any alteration of data being reviewed (i.e., such data is presented in a read-only context and may be retrieved from storage in a one-way manner, such that no writing to a data storage may be performed, preventing any alterations). In this manner, the integrity of data being reviewed may be assured, while still allowing a user to submit any necessary review input (such as the completion of a review form or submission of analysis results).

Further according to the embodiment, a data manager may present data for review to a review manager as described above, and may also perform initial analysis of data such as to determine a manner in which it may be presented (such as, for example, presenting data in a particular order or arrangement). Such analysis may be configurable, such as by a stored configuration similar to stored configuration of a review manager as described above, or may be user-configurable such as during a review operation, for example a user selecting how they wish data to be presented (for example, choosing a sorting method for a quantity of data, such as "show newest first" or "sort by agent" in the context of a contact center review). In this manner, stored data may be request by either a review manager or a data manager either simultaneously or interchangeably as may be appropriate, such as a review manager requesting a quantity of data to present an overview of available data to a user performing a review operation, while a data manager may request a subset of such data according (for example) to configurations made by a user—continuing with an exemplary contact center review context, a user may be presented with an overview of all contact center interactions with customers (data presented to a review manager) with a subset of data being distinguished (such as being presented in a unique fashion, for example highlighted or otherwise visually indicated) as a subset representing (for example) all calls involving a particular agent being scored.

According to another preferred embodiment, a method for providing enhanced review with automation, is disclosed. According to the embodiment, an evaluator (that may be a human user or software-based automatic evaluator interchangeably, as described previously) may request data for review. In a next step, data may be analyzed such that additional similar or relevant data may be presented (for example, based on known information such as an agent's name or call success indicators), and may then be organized (such as sorted according to a variety of fixed or configurable criteria, such as call length or whether or not a particular success indicator was met, i.e. a positive customer satisfaction survey result), and then may be presented for review. In a final step, some or all review information may be automatically populated or submitted on behalf of an evaluator, such as filling in form fields with known information such as an agent's name or call length, for example based on the results of previous steps.

In this manner, analysis may be economized in terms of both relevancy and speed by enhancing the manner in which data is presented for review (by analyzing or organizing data, such that increased relevancy or value may result in increased availability or priority in presentation), as well as by automatically populating or submitting review information to reduce unnecessary or repetitive data input by an evaluator. By combining such techniques with software-based evaluation, varying degrees of automation may be achieved as may be desirable according to a particular arrangement or use case, and according to the nature of data being reviewed.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
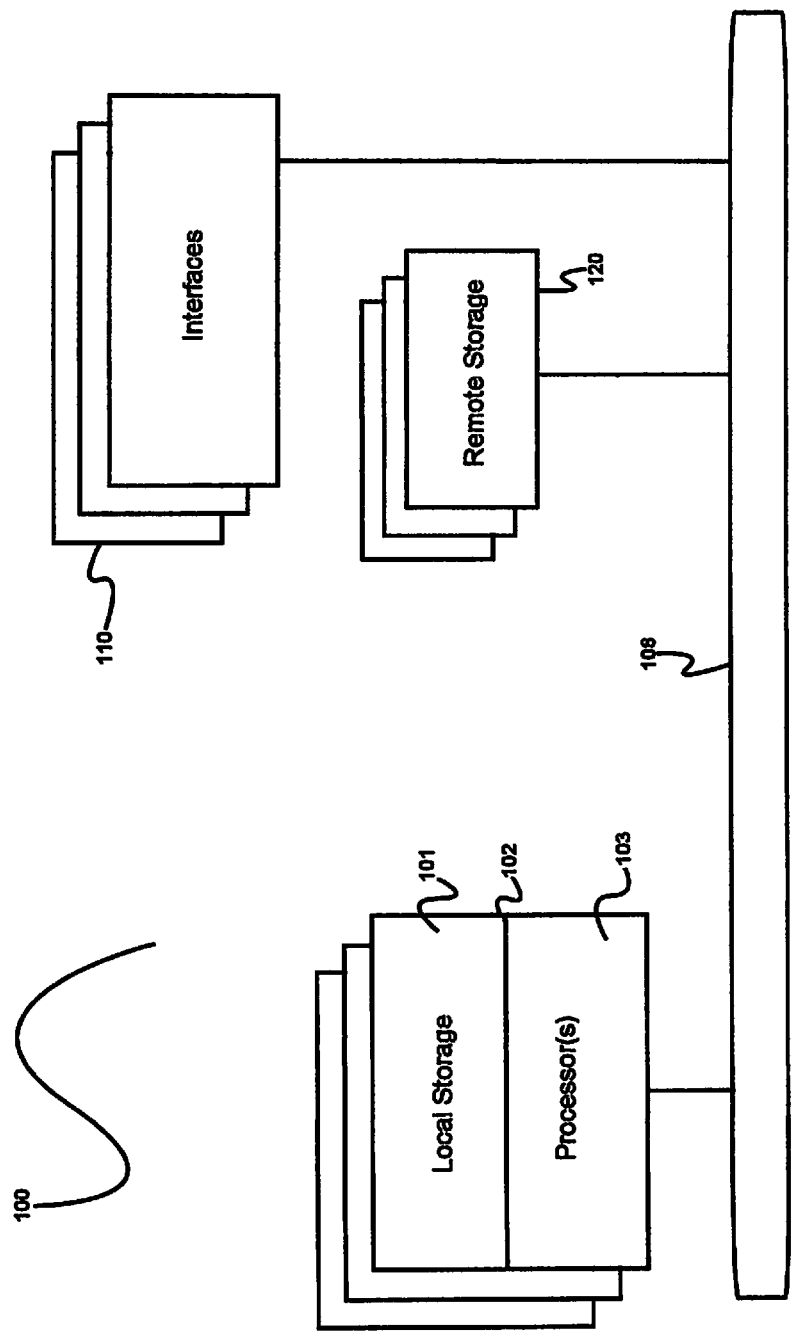
FIG. 1 is a block diagram illustrating an exemplary hardware architecture of a computing device used in an embodiment of the invention.

The inventor has conceived, and reduced to practice, a system and method for performance review supported by automated analysis.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
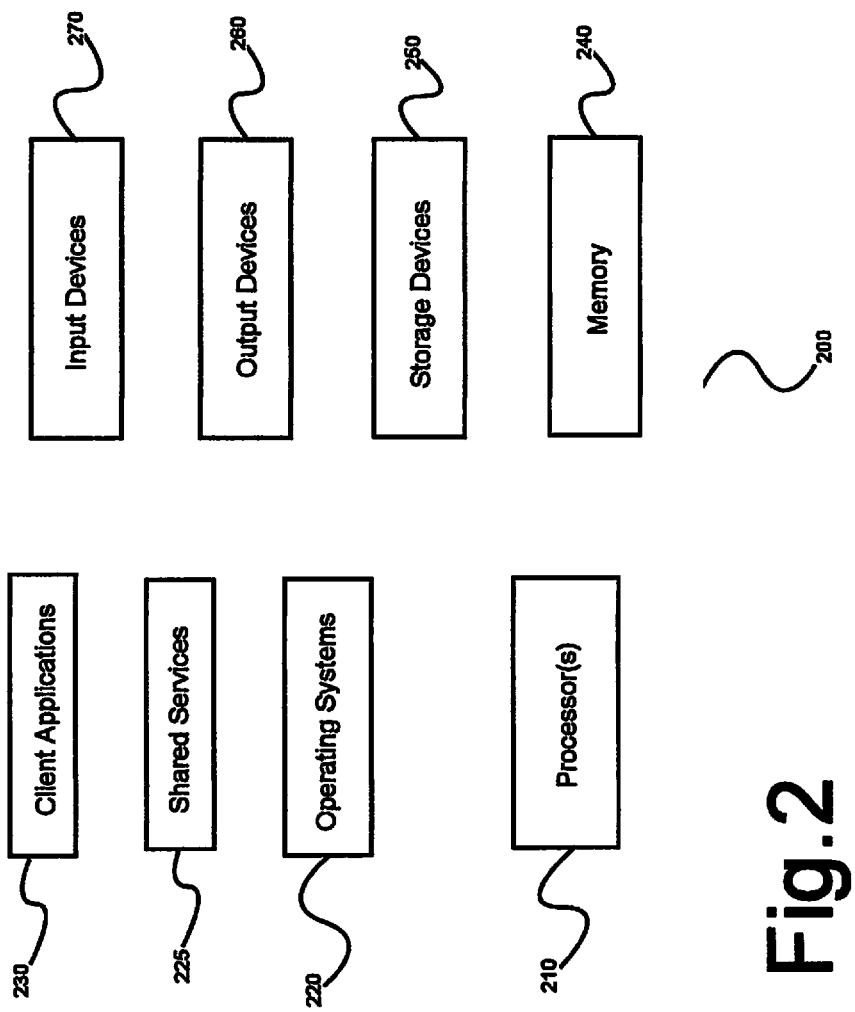
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
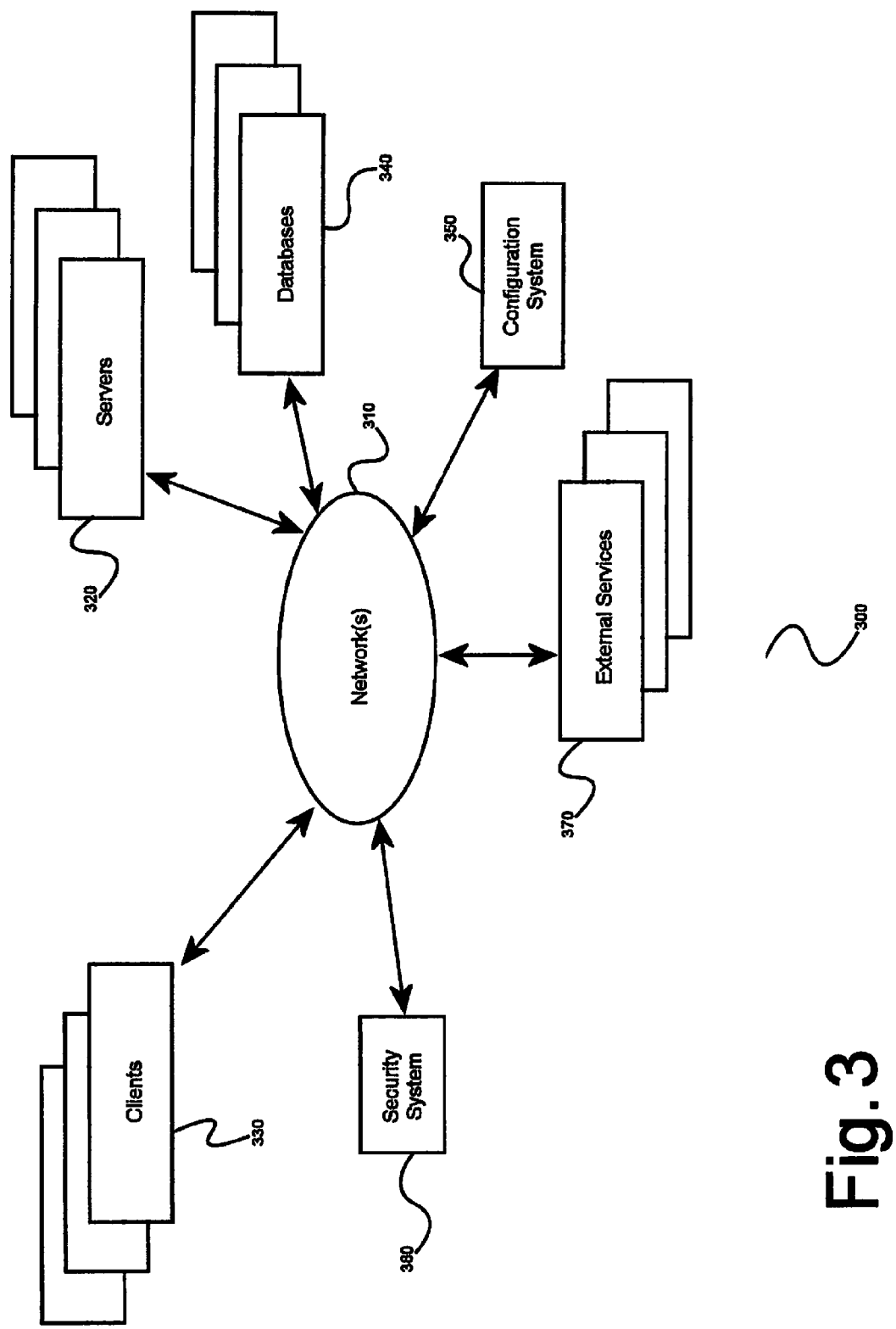
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
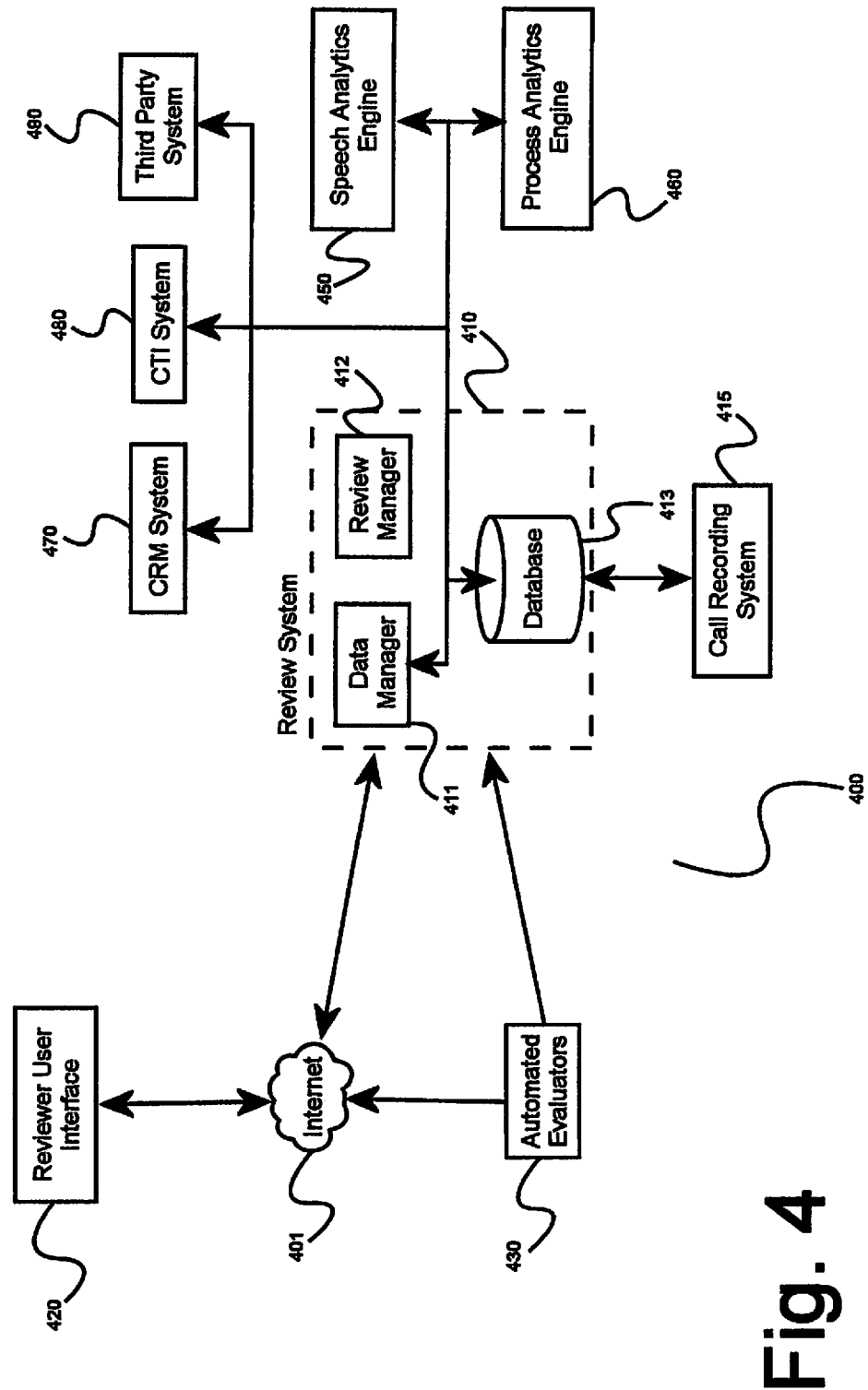
FIG. 4 is a block diagram of an exemplary system architecture for performance review with automation, according to a preferred embodiment of the invention.

FIG. 4 is a block diagram illustrating an exemplary system 400 for data analysis with automation, according to a preferred embodiment of the invention. As illustrated, various traditional components of a computing network may be interconnected and in communication via the Internet 401 or a similar data communications network. It should be appreciated by one having ordinary skill in the art, that such an arrangement is exemplary and a variety of connection and communication means exist which may be utilized according to the invention, and it should be further appreciated that various combinations of connections and communication means may be utilized.

As illustrated, a review system 410 may comprise a database 413 that may store a variety of data from a plurality of data input sources (described below) such as performance reports, interaction records, user preferences or configurations, or any other such data that may be relevant to a review operation or a particular implementation of a system 400. It should be appreciated that particular data sources may vary widely according to the nature of operations being reviewed, for example a contact center data source may provide a variety of customer interaction information such as call statistics or agent performance records, whereas a software development enterprise data source may provide such information as error logs or server performance statistics. Review system 410 may further comprise a data manager 411 that may analyze and present stored data to a review manager 412 that may then present data to a plurality of evaluators via reviewer user interface 420. Such analysis may vary widely according to the nature of a review operation or data being analyzed, such as (according to an exemplary contact center review context) analyzing call record data for call length (such as to return a set of all calls falling within selected length parameters), call results (such as returning all calls that were determined to have been "successful", such as resulting in a positive customer feedback survey or other metric), or keywords or phrases (such as returning all calls containing a particular phrase, such as for example checking whether an agent under review used a particular wording as per operation procedure, or returning calls that omit particular selected words or phrases, such as ensuring an agent did not use particular wording). It should be appreciated that such analysis criteria are exemplary, and may vary widely according to the invention.

In a preferred embodiment, call recording system 415 records phone calls or other interactions arriving at or generated from a contact center, and stores the resulting recordings in database 413. It will be understood by one having ordinary skill in the art that call recording systems 415 exist that can record conventional phone calls, voice-over-Internet-protocol phone calls, instant messages, emails, and other interaction types; any of these systems may be combined in a particular embodiment as needed to handle the various interaction types that may need to be recorded in a particular contact center. In some embodiments, call recording system 415 may be located remotely from review system 410, for example in a cloud-based call recording service, or in a telephone network facility, or in a separate enterprise data center. Moreover, a plurality of call recording systems 415 may be connected to a plurality of physically distinct databases 413, in support of ongoing interaction review operations by review system 410.

In some embodiments, data manager 411 may automatically identify regions or areas of an interaction that are of particular interest, and mark them in database 413, for example by inserting metadata identifying a region of interest. Typically such metadata may also comprise an indicator such as a reason code that identifies why the particular region is likely to be of interest to a reviewer. For example, if certain keywords have been identified as being particularly strong indicators of potential problems (or conversely of exceptional service), they may be automatically detected by speech analytics engine 450; speech analytics engine 450 may be collocated with data manager 411, or may be located separately from data manager 411. In some embodiments, speech analytics engine 450 may be resident on the same machine as data manager 411. In other embodiments, speech analytics engine 450 may be a web service or web-accessible API operated by a third party. More than one speech analytics engine 450 may be used, according to the invention. For example, a word-spotting speech analytics engine 450 may be used for use cases such as the one just described, while another speech analytics engine 450 accessible via data manager 411 may be a phoneme search-based speech analytics engine that allows reviewers to make more open-ended queries such as "find all interactions where the customer said 'That's not what I want'". Speech analytics engine 450 may tag recordings with metadata in real time as interactions occur, or speech analytics may be conducted in a separate process after a recording is completed, with metadata being added to database 413 with reference to a specific interaction after the interaction is completed. It should be noted that, in some embodiments, ad hoc analyses may be conducted at much later times for a collection of interactions in database 413 (for example, when an adverse event is detected in a call, a quality monitor may desire to search back through a few weeks' or months' worth of calls for other calls where this has occurred, to determine whether a systemic problem exists that has previously gone undetected); it is intended according to the invention that metadata may be added to an interaction at any time after the interaction starts.

Similarly, process analytics engine 460 may automatically, or as directed by a user, conduct automated analyses of a plurality of interactions to detect patterns that may be indicative of underlying quality issues. Process analytics engine 460 may tag interactions, or groups or types of interactions, with metadata in database 413 based on the results of these analyses. For example, process analytics engine 460 may detect that a certain type of interaction has suddenly begun to take longer than its typical time. Or, it may determine that a particular group of agents tends to transfer a certain type of interaction to others more often than expected; or, such a data point may suddenly change value, with more or fewer transfers taking place after a certain time than typically occur. This may indicate an underlying issue, and may require quality monitors to carefully review interactions where such transfers took place (or, conversely, where they were expected to occur but didn't—for instance, where service calls were expected to be transferred to sales at a 10% transfer rate but suddenly all transfers ceased, this could indicate an underlying product quality issue or an agent training issue). Interactions with anomalous process metadata can be identified or flagged for later review just as interactions with anomalous speech analytics results can be (and by extension text analytics can of course be used as well, generally using the same speech analytics engine 450). An additional common specialized type of process analytics engine 460 that may be used according to the invention is known as a performance management system, and typically computes performance metrics for individual agents and groups of agents and makes them available to data manager 411 and thereby to reviewers using reviewer user interface 420.

Data obtained during or related to an interaction from a customer relationship management (CRM) system 470, or from attached data in computer-telephony integration (CTI) system 480—or indeed from any third-party system 490—may also be associated with the interaction in database 413 to facilitate identification of interactions or selection of critical points within interactions, or to flag suspect interactions to ensure they are reviewed by quality monitoring personnel. For example, CRM system 470 may tag each interaction with attributes such as customer level (platinum, gold, silver), products owned, credit level or collections status, and so forth. CTI system 480 may flag key points in an interaction, such as by identifying the exact point within an interaction when certain data is added to or associated with the interaction, or identifying transfer points, points where the interaction is held or suspended, and so forth. Third party systems 490 could tag interactions based on previous web interaction history, or they could tag interactions based on results of specialized analyses such as churn risk, fraud risk, and the like. Moreover, desktop applications may act as third party systems 490 and tag interactions with detailed information about agent desktop activities during the interaction; similarly, web applets or web services may tag interaction records in database 413 with detailed information about user activities within a browser during the interaction.

It should be clear that, by using various combinations results from one or more of speech analytics engine 450, process analytics engine 460, CRM system 470, CTI system 480, and various other third party systems 490, it is practical to embed a rich array of metadata in or associated with interaction recordings in database 413, making those recordings searchable by relevant attributes such as fraud risk, quality risk, sales opportunity, abnormal interaction outcomes, and so forth. Furthermore, metadata may be associated with particular times or points within an interaction, allowing reviewers to skip to "interesting bits" without having to listen to "routine bits" (or to play routine bits at faster speed to avoid wasting time in unproductive monitoring/reviewing activities).

Review manager 412 may present data to a plurality of evaluators via reviewer user interface 420, such as directly presenting data for manual analysis (i.e., without being analyzed by a data manager 411 as described previously), or presenting data results of analysis by a data manager 412, interchangeably. In this manner, multiple sets of data may be presented such as with varying analysis performed prior to presentation, as may be used to economize a review operation—for example, stored data may be analyzed according to a variety of preconfigured or configurable criteria, or sorted for more efficient presentation, or any other such operations to improve review efficiency. For example, an evaluator may submit (using reviewer user interface 420) a variety of analysis criteria to "weed out" irrelevant data such as (continuing an exemplary contact center review operation) calls from agents other than those being reviewed, calls received outside of operation hours, or calls wherein a customer was placed in a waiting queue or on hold, and then disconnected (thus never interacting with an agent). Additionally, the manner in which analysis results are presented may also be configurable, such as requesting that each analysis be performed and presented independently, such that a single set of data may be analyzed according to multiple criteria as described above in the example, rather than the results of one analysis operation then being analyzed according to the next criteria in series, as may be desirable according to other review operations. In this manner, it can be appreciated that any particular behavior or criteria for analysis may be configurable by an evaluator using reviewer user interface 420 during a review operation, or may be stored as configuration information (such as in a database 413) to be loaded during operation (such as default operation behavior or preconfigured, unchangeable behaviors). It should be further appreciated that an evaluator may request data without analysis using reviewer user interface 420, such that a review manager 412 may present data directly without any interaction with a data manager 411, as may be desirable (for example) to see all available data prior to configuring analysis behaviors.

It should be appreciated that, as illustrated, an evaluator need not explicitly be a human user using reviewer user interface 420 and may be a software component 430 performing review or analysis operations by interacting with a review system 410 according to the invention, and that multiple evaluators may be utilized, with varying combinations of human evaluators 420 and software evaluators 430 being utilized interchangeably as appropriate; each human reviewer would user an instance of reviewer user interface 420, whereas automated reviews may be conducted by data manager 411 or a dedicated automated evaluator 430. In this manner, fully-automated review or analysis operations may be possible through components interactions, such as a software-based evaluator 430 interacting with a review system 410 to review data and submit any results of such review to be stored such as in a database 413 or to be presented in an external system such as being sent to external users or systems such as via e-mail or other electronic communication means. In this manner, review and analysis operations may be automated to varying degrees as may be desirable, by utilizing system components to perform operations that may be traditionally handled by a human user, such as data analysis by a data manager 411 or review of such data by a software-based automated evaluator 430, enabling more efficient review operations such as may be desirable when the nature of data or review operations may be improved by partial for total automation. A further example might be a human evaluator using reviewer user interface 420 aided by a software evaluator 430 that may increase review efficiency such as by analyzing data being presented and filling out review form information based on analysis results (such as filling out basic information on call length or agent name, so that a human evaluator 420 may not need to repeatedly input the same information or information that may be readily determined from data being reviewed). In this manner, partial automation may be seen to improve review operations by economizing human interaction, i.e. "making the most" out of a human evaluator's interactions and not requiring repetitive or low-value input by utilizing a software-based evaluator to perform such input or operations on the human evaluator's behalf.

In preferred embodiments, reviewers using review manager 412 may select a plurality of interactions for analysis, monitoring, or reviewing by conducting a variety of search-like queries against metadata associated with interactions in database 413. For example, a reviewer could select all interactions in Sales over the last three months.

It should be appreciated that components of a review system 410 may be accessible to an interact with various external components not illustrated, such as system components present in a corporation or other organization operating a system 400 according to the embodiment, such as (for example, according to an arrangement operating within a contact center) an interactive voice response (IVR) system that may interact with a data manager 411 such as to collect data on customer selections in an IVR prompt, or software application programming interface (API) such as to enable additional functionalities or behaviors or to enable existing components in an organization to interact with components of a review system 410. In this manner it can be appreciated that system 400 may be readily adapted for operation in any appropriate organization or context, and may interact with any additional or alternate components according to the embodiment.

Detailed Description of Exemplary Embodiments

Figure 5:
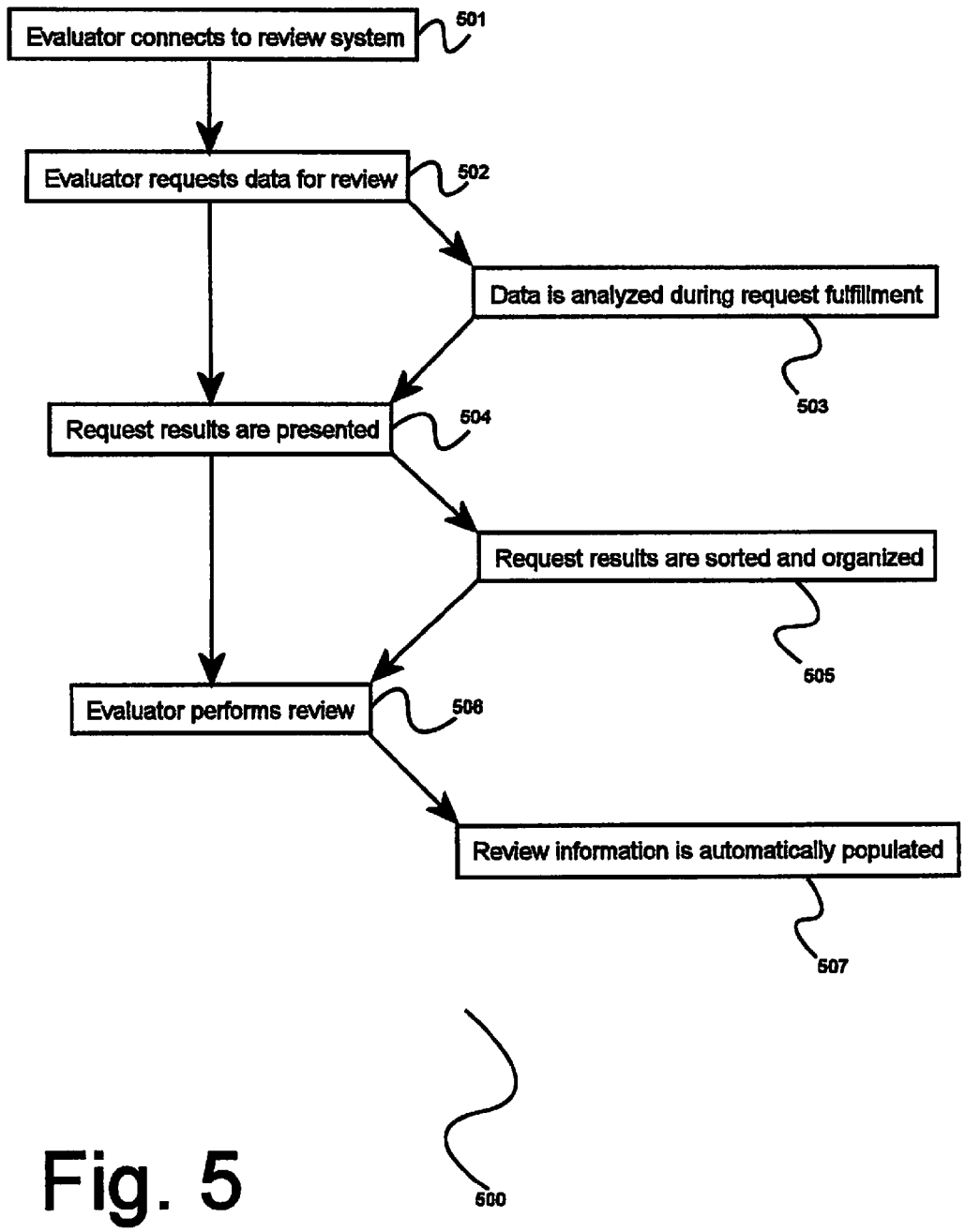
FIG. 5 is a method diagram illustrating en exemplary method for providing data review automation, according to a preferred embodiment of the invention.

FIG. 5 is a flow diagram illustrating an exemplary method 500 for automation of data review, according to a preferred embodiment of the invention. As illustrated, in an initial step 501 an evaluator may connect to a review system such as to perform review operations or simply to view data available for potential review. In a next step 502, an evaluator may request data such as submitting a query for particular data (for example, searching for all available call records pertaining to a particular contact center agent), or requesting all available data (such as by viewing available data for manual browsing). In a next optional sub-step 503, data may be analyzed as it is queried, such as to determine relevant data that might not have been included in the results of an initial query from a previous step 502 (for example, if an evaluator requests all call records involving an agent "John Smith", additional calls may be analyzed and returned if they involve an agent "Jon Smith" or similar behavior, such that similar data may be presented). It should be appreciated that such analysis and search behavior may be performed with the aid or interaction of additional components such as speech analysis software or systems, such as to analyze spoken content of call recordings for keywords or phrases as described above, and that a wide variety of additional or alternate components or behaviors may be utilized according to the invention.

In a next step 504, data may be presented to an evaluator. In a next optional sub-step 505, data may be analyzed and sorted or otherwise organized for presentation, such as presenting results in order of relevancy based on analysis results (for example, placing additional call records matching similar but non-exact agent names lower in a presentation order than those matching an exact query), or for example ordering results based on evaluator preference (such as an evaluator requesting that results be sorted in a particular fashion, or stored evaluator preferences or known previous interactions) or based on known relevancy factors such as placing calls that resulted in a "success" metric (such as a completed sale or a positive customer satisfaction survey) higher in a presentation order such that more relevant or valuable data may be made more readily available to an evaluator for further review (such as to enable an evaluator to examine common factors in successful calls, such as to find what determines an agent's success for future training or coaching operations to improve other agents or overall contact center operations). In this manner, data may be presented in a manner such as to improve efficiency of a review operation such as by making more relevant or valuable data immediately accessible to an evaluator, with less relevant or lower-value data being given a lower priority in presentation. In this manner, data value or relevancy may be linked to availability, i.e. more relevant data is more readily available for review, such that an evaluator may not need to browse through data to manually locate desirable data for review.

In a next step 506, an evaluator may perform review operations on presented data, such as listening to call records and submitting performance review data or other review behavior according to the nature of data being reviewed. In a final optional sub-step 507, various review data may be pre-filled or submitted based on analysis performed in previous steps, or based on readily-available information pertaining to data being reviewed (such as filling in an "agent name" field based on a submitted query for a specific agent). In this manner, review operations may be enhanced by automatically populating information and thereby minimizing additional data entry by an evaluator, such that the evaluator may focus on other aspects of a review (such as listening to the content of a call record to judge an agent's performance rather than focusing on repeatedly filling out basic information such as the agent's name or the call duration). It should be appreciated that it may be possible for all review data to be populated in this manner, i.e. a fully-automated review operation may be performed according to the invention, as may be appropriate according to a particular arrangement and according to the nature of data being reviewed. It should be further appreciated that any and all automated behaviors described herein may be overridden or further configured as may be desirable by an evaluator, such as in the case of inaccurate or undesired results.

The skilled person will be aware of a range of possible modifications of the various embodiments described above. Accordingly, the present invention is defined by the claims and their equivalents.

What is claimed is:

1. A system for semi automated review of contact center agent performance, comprising:
   a data manager stored and operating on a network-connected computer;
   an evaluator user interface software module stored and operating on a network-attached computer;
   a speech analytics engine coupled via a network to the data manager;
   a plurality of automated evaluator software modules stored and operating on a plurality of network-attached computers;
   a network-connected database adapted to store call recordings and associated metadata; and
   a call recording system coupled to the database and adapted to store call recordings in the database;

wherein the call recording system records customer calls and stores the resulting call recordings in the database;

wherein the data manager collects and preprocesses a plurality of data elements pertaining to a plurality of specific call recordings and stores them in the database as metadata associated with the respective call recordings;

wherein the speech analysis engine conducts automated speech analysis of a first call recording, tags the first call recording with a first time-specific metadata element based on the results of the automated speech analysis, and stores the first time-specific metadata element in the database as part of the first call recording;

wherein at least one of the plurality of automated evaluator software modules performs automated analysis of a plurality of call recordings and their associated metadata and, based on the results of the automated analyses, prioritizes at least a subset of the plurality of call recordings for review by a human reviewer using the evaluator user interface software module; and wherein the data manager delivers call recordings from the prioritized subset to the evaluator user interface software module in priority order.

2. The system of claim 1, further comprising a process analytics engine coupled via a network to the data manager; wherein the process analytics engine conducts automated analysis of a second call recording, tags the second call recording with a first time-specific metadata element based on the results of the automated speech analysis, and stores the first time-specific metadata element in the database as part of the first call recording.

3. The system of claim 1, wherein the first call recording is sent to the evaluator user interface software module with a further data element comprising a time corresponding to a specific time relative to call start within the first call recording that requires special attention from the reviewer.

4. A method for semi automated review of contact center agent performance, the method comprising the steps of:

recording, using a call recording system coupled to a network-connected database, customer calls and storing the resulting call recordings in the database;

collecting and preprocessing, using a data manager software module stored and operating on a network-connected computer, a plurality of data elements pertaining to a plurality of specific call recordings and storing them in the database as metadata associated with the respective call recordings;

conducting, using a speech analysis engine coupled to the database via a network, automated speech analysis of a first call recording;

tagging the first call recording with a first time-specific metadata element based on the results of the automated speech analysis;

storing the first time-specific metadata element in the database as part of the first call recording;

performing, using a plurality of automated evaluator software modules stored and operating on a network-connected computer, automated analysis of a plurality of call recordings and their associated metadata;

based on the results of the automated analyses, prioritizing at least a subset of the plurality of call recordings for review by a human reviewer using an evaluator user interface software module; and delivering call recordings from the prioritized subset to the evaluator user interface software module in priority order.

* * * * *